(12) United States Patent
Meisen

(10) Patent No.: US 6,280,649 B1
(45) Date of Patent: Aug. 28, 2001

(54) METHOD OF PRODUCING PRECIPITATED MAGNETITES

(75) Inventor: Ulrich Meisen, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/556,001

(22) Filed: Apr. 20, 2000

(30) Foreign Application Priority Data

Apr. 30, 1999 (DE) ............................................. 199 19 791

(51) Int. Cl.[7] ................................................... C01G 49/08
(52) U.S. Cl. .................................... 252/62.59; 252/62.56; 106/456; 423/632
(58) Field of Search ............................ 252/62.56, 62.59; 423/632; 106/456

(56) References Cited

U.S. PATENT DOCUMENTS

| | | |
|---|---|---|
| 802,928 | 10/1905 | Fireman . |
| 3,970,738 | 7/1976 | Matsui et al. ..................... 423/140 |
| 4,753,680 | 6/1988 | Burow et al. ..................... 106/304 |
| 4,975,214 | * 12/1990 | Sakashita et al. ................ 262/62.59 |
| 4,992,191 | 2/1991 | Mori et al. ....................... 252/62.59 |
| 5,688,852 | 11/1997 | Misawa et al. ................... 524/431 |
| 5,733,471 | 3/1998 | Hashiuchi et al. ............... 252/62.56 |
| 5,759,435 | 6/1998 | Miyazono et al. ............... 252/62.59 |

FOREIGN PATENT DOCUMENTS

| | | |
|---|---|---|
| 3209469 | 9/1982 | (DE) . |
| 216 040 | 11/1984 | (DE) . |
| 284 478 | 11/1990 | (DE) . |
| 197 02 431 | 7/1998 | (DE) . |
| 1535889 | 12/1978 | (GB) . |
| 2040904 | 9/1980 | (GB) . |
| 51-44298 | 4/1976 | (JP) . |
| 61-34070 | 2/1986 | (JP) . |

OTHER PUBLICATIONS

Bulletin of the Chemical Society of Japan, vol. 47,(7), (month unavailable) 1974, pp. 1646–1650, Masao Kiyama, Conditions for the Formation of $Fe_3O_4$ by the Air Oxidation of $Fe(OH)_2$ Suspensions.

* cited by examiner

Primary Examiner—C. Melissa Koslow
(74) Attorney, Agent, or Firm—Joseph C. Gil; Thomas W. Roy

(57) ABSTRACT

The present invention relates to a method of producing magnetite particles useful for the production of toners by
(a) placing an alkaline component in the form of an aqueous solution in a vessel under a protective gas,
(b) adding 1.0 to 3.0 mol %, relative to Fe of the magnetite, of a silicate component to form a reaction mixture,
(c) heating the reaction mixture to a precipitation temperature of 60 to 80° C.,
(d) adding an iron(II) component at a rate of 0.5 to 1.5 mol of Fe/hour per mol of the alkaline component until the pH of the suspension is 7.0 to 8.5, and
(e) oxidizing the suspension with an oxidizing agent at a rate of 20 to 5 mol % of Fe(II)/hour to an Fe(III) content of 65 to 75 mol % of Fe(III).

10 Claims, No Drawings

METHOD OF PRODUCING PRECIPITATED MAGNETITES

BACKGROUND OF THE INVENTION

The present invention relates to a method of producing magnetite particles that are useful for the production of toners.

Particulate magnetites that are produced by a precipitation method from aqueous solutions have long been known. The production of magnetite by the precipitation of iron(II) sulfate with an alkaline component and subsequent oxidation with air is known from U.S. Pat. No. 802,928 (Fireman, 1905). Starting from this basic invention, numerous patents have since been granted that relate to the production of magnetites by a precipitation method.

These materials were first used for the production of paints of all types. The particular advantage of magnetites compared with organic colorants and carbon black is that they exhibit a very much better resistance to weathering, so that paints of this type can also be used for external applications.

Precipitated magnetites are also used for coloring concrete moldings, such as concrete paving slabs and concrete roof tiles.

Magnetites have also been used for some time in electrophotography for the production of toners. Magnetites which are produced by a precipitation method are particularly preferred for the production of toners for copier equipment which employs single-component toners. The magnetic toners that are used for this purpose must have specific properties.

With the continuing development and improvement of copier equipment and printers, the requirements imposed on magnetic toners, and consequently on the magnetites that are used for this purpose, are becoming increasingly stringent. The most recent generation of printers achieves a resolution of more than 400 dpi (dots per inch), which has led to the development of finely divided toners with a very narrow particle size distribution.

As a consequence, the magnetites that are used for this purpose must have a very narrow particle size distribution. Moreover, a defined particle size is necessary, so that a homogeneous distribution of the magnetite particles in the finished toner is ensured. The magnetites themselves must have a sufficiently high electrical resistance in order to stabilize the latent image during the electrostatic transfer thereof.

In addition, the coercivity, saturation magnetization and above all the residual magnetization must be in the correct ratio to the prevailing field strengths in the machine. It is therefore necessary to develop toners, and thus to develop magnetites with special properties, for each class of copier equipment.

There is therefore a need for the production of magnetites that have properties that make them just as suitable for the production of magnetic toners as they are for use in colorants for coloring paper, plastics, lacquers, fibers, and concrete.

The production of magnetites by a precipitation method with the addition of silicon is described in JP-A 51/044,298 (Showa). Pure precipitated magnetites without the addition of extraneous elements can be produced batch-wise according to DE-A 3,209,469 or continuously according to DE-A 2,618,058. $FeSO_4$ is used as the iron(II) salt in the aforementioned patents.

However, it is also possible to use any soluble iron(II) salt for the production of a magnetite by a precipitation method. The use of $FeCl_2$, as described in DE-A 3,004,718, is particularly suitable for this application. The use of $FeSO_4$ or $FeCl_2$ has the advantage that both of these substances can be obtained very inexpensively as by-products of the steel processing industry. Apart from sodium hydroxide, which is the precipitant most frequently used, CaO or $CaCO_3$ (DE-A 3,004,718), ammonia (DE-A 2,460,493), or $Na_2CO_3$, $MgCO_3$, or MgO (EP-A 187,331) can also be used as precipitants. Air is generally used as the oxidizing agent.

Methods of oxidation using nitrates have also been described, however (DD-A 216,040 and DD-A 284,478).

The production of Si-containing magnetites for use in magnetic toners is particularly advantageous. These exhibit a charging behavior that differs from that of pure magnetites and have a higher thermal stability at the same particle size. A method of producing particles of this type is described in JP-A 61/034,070 (Showa). The Si component here is added to iron(II) sulfate, which results in the precipitation of hydrated silica and thus results in a non-uniform distribution of the Si in the magnetite lattice.

U.S. Pat. No. 4,992,191 describes a magnetite comprising 0.1 to 5.0 atomic % Si with respect to Fe, which is claimed to be particularly suitable for the production of toners. In this respect, it is particularly important whether the Si is concentrated at the surface, as described in EP-A 808,801, or whether it is uniformly distributed over the particles as a whole. In addition, inorganic surface modifications are known from U.S. Pat. No. 5,688,852. Apart from Si, the elements Al, Zr, and Ti are used here in the form of their oxides or hydroxides. Methods of post-treatment with organic substances are also known, such as those which are described in EP-A 750,233, for example. Titanium-containing esters of long-chain fatty acids play a particularly important part here.

The particle size and particle shape of magnetites can be controlled by the pH during precipitation. At high values of pH and at correspondingly low values of the Fe(II)/NaOH ratio (less than 0.47), octahedra are obtained. These particles exhibit the highest coercivity and remanence. If magnetites are precipitated starting at an Fe(II)/NaOH ratio higher than 0.48, round particles distinguished by their very low remanence are increasingly obtained. Moreover, these particles are generally relatively finely divided by comparison with magnetites produced at other pH values. These relationships were identified by Kiyama in 1974 (*Bull. Chem. Soc. Japan,* 47(7) 1646–50 (1974)).

Another means of producing more finely divided magnetites is to reduce the precipitation temperature and reaction temperature. It is known from the aforementioned work of Kiyama that the range of existence of $Fe_3O_4$ becomes smaller with decreasing temperature. According to this work, pure magnetite is formed at Fe(II)/NaOH ratios from 0.55 to 0.45 at a temperature of 50° C. If the precipitation temperature and reaction temperature are increased, the range of existence of magnetite is broadened. Magnetite is obtained at higher temperatures, particularly in alkalis.

A further important factor of influence in the production of precipitated magnetites is the oxidizing agent. In the case of atmospheric oxygen, the efficiency depends on the distribution of air bubbles in the suspension. The tendency for the more thermodynamically stable goethite to be formed generally increases as the flow of air increases.

If the production of finely divided magnetites is desired, it is necessary to develop a method that takes all the aforementioned facts into account. It is also important that any additives used (e.g., Si or other metals) are capable of effecting a considerable shift in the tendency of magnetite to form.

The underlying object of the present invention was therefore to develop a method of producing magnetites that are particularly suitable for use in finely divided single-component toners. Apart from a small particle size (about 0.1 μm), magnetites of this type must exhibit a low remanence, a low coercivity, and a sufficiently high thermal stability.

Furthermore, magnetites of this type must have a narrow particle size distribution.

This object has been achieved by the provision of the following method:
1. placing an alkaline component in a vessel and passing a protective gas through it,
2. adding the silicate component,
3. heating this mixture, with stirring, to the precipitation temperature,
4. adding an iron(II) component,
5. heating to the reaction temperature, and
6. oxidizing with an oxidizing agent to obtain an Fe(III) content greater than 65 mol %.

SUMMARY OF THE INVENTION

The present invention therefore relates to a method of producing a magnetite having a specific surface of 9 to 15 $m^2/g$, a coercivity of 45 Oe ($\triangleq$3.58 KA/m) to 75 Oe ($\triangleq$5.97 KA/m), and a settled apparent density of 1.1 to 1.3 $g/cm^3$ comprising
(a) placing an alkaline component in the form of an aqueous solution in a vessel under a protective gas,
(b) adding 1.0 to 3.0 mol % (preferably 1.7 to 2.5 mol %), relative to Fe of the magnetite, of a silicate component to form a reaction mixture,
(c) heating the reaction mixture to a precipitation temperature of 60 to 80° C. (preferably 65 to 75° C.),
(d) adding an iron(II) component at a rate of 0.5 to 1.5 mol of Fe/hour per equivalent of the alkaline component until the pH of the suspension is 7.0 to 8.5 (preferably 7.2 to 7.6), and
(e) oxidizing the suspension with an oxidizing agent at a rate of 20 to 5 mol % of Fe(II)/hour (preferably 14 to 10 mol % of Fe(II)/hour) to an Fe(III) content of 65 to 75 mol % of Fe(III).

DETAILED DESCRIPTION OF THE INVENTION

An alkali hydroxide, an alkaline earth hydroxide, an alkaline earth oxide, an alkali carbonate, $MgCO_3$, or ammonia can be used as the alkaline component. A water-soluble alkali silicate is typically used as the silicate component. Iron(II) is typically used in the form of a water-soluble Fe(II) component, with $FeSO_4$ or $FeCl_2$ being most preferably used. It is also possible, however, to use other water-soluble Fe(II) compounds.

Atmospheric oxygen, pure oxygen, $H_2O_2$, alkali metal chlorates(V), alkali metal chlorates(VII), chlorine, or nitrates can be used as the oxidizing agent. Atmospheric oxygen, pure oxygen, $H_2O_2$, or sodium nitrate are most preferably used for economic reasons.

During the oxidation, it should be ensured that the rate of oxidation is not too high, since unwanted α-FeOOH is then formed as a second compound. The oxidation rate should be between 20 and 5 mol % of Fe(II)/hour. This oxidation step relates to a stoichiometric magnetite containing 33.3 mol % Fe(II). Therefore, only 66.6% of the Fe(II) need be oxidized to Fe(III) in order to produce a magnetite of this type from a pure Fe(II) solution. Therefore, if a batch containing 10 mol Fe(II) sulfate is oxidized to magnetite in 5 hours, this corresponds to an oxidation rate of 20 mol % of Fe/hour, since the amount of Fe(II) to be oxidized is 6.66 mol.

One particularly preferred embodiment for producing the claimed magnetite is as follows:

Sodium hydroxide solution with a content of 300 g of NaOH per liter is placed in a stirred batch vessel while stirring and passing a protective gas through the batch. The scheduled amount of sodium silicate with a content of 125 g/liter of Si is added to this sodium hydroxide solution. The batch is subsequently heated to the desired precipitation temperature. When the precipitation temperature is reached, the batch is precipitated with a solution of an iron(II) salt (e.g., $FeSO_4$) until the target pH is reached.

The precipitation temperature is between 60 and 80° C., preferably between 65 and 75° C. A solution of $FeSO_4$ or $FeCl_2$ is used as the iron(II) component. Such iron(II) solutions have an Fe content of 60 to 180 g of Fe/liter, preferably 65 to 120 g of Fe/liter and more preferably 80 to 95 g of Fe/liter. The Fe(III) content of the solution is between 0.2 and 1.2 mol %, preferably between 0.3 and 0.6 mol %. The target pH is between 7.0 and 8.5, preferably between 7.2 and 7.6.

The Fe(II) component is added at a rate of 0.5 to 1.5 mol of Fe/hour per equivalent of NaOH or other alkali. After the addition of the requisite amount of Fe(II) component is complete, the resultant reaction batch is heated to the reaction temperature. In many cases, the precipitation temperature and the reaction temperature are identical, so that a separate heating step is not necessary.

When the reaction temperature is reached, sparging with protective gas is terminated and the addition of the oxidizing agent is commenced. If air is used for sparging, air is introduced beneath the stirrer via a sparging device. The selected oxidation rate is between 20 and 5 mol % of Fe(II)/hour, preferably between 14 and 10 mol % of Fe(II)/hour.

EXAMPLES

The properties of the final magnetites were measured by the methods described below.
1. The magnetic properties (i.e., coercivity, specific saturation magnetization, and specific residual magnetization) were measured using specimen magnetometer at a field strength of 5000 Oe ($\triangleq$397.5 KA/m).
2. The BET specific surface was measured according to DIN 66 131 using a gas mixture of 90% He and 10% $N_2$ and a measurement temperature of 77.4 K, preceded by baking out at 140° C. for 60 minutes.
3. Si elemental analysis: Si was determined by spectral analysis using ICP-OES.
4. Fe, Fe(II), Fe(III) elemental analysis: Determinations made according to DIN 55 913. The Fe(II) content was determined by titration with $KMnO_4$ using a Memotitrator (Mettler DL70). Fe(III) was determined analogously, with $TiCl_3$. The total iron content was calculated from the individual values and from the amount weighed in. The contents of the two analysis solutions were determined daily.
5. Particle shape and particle size: Assessment of particle size and shape were determined by from transmission electron microscope (TEM) photographs with a magnification of 30,000.
6. Determination of settled apparent density: The settled apparent density was determined according to ISO 787.

Example 1

8000 kg of sodium hydroxide solution having a content of 300 g/l, corresponding to 200 kmol of NaOH, were introduced into a stirred vessel having a usable volume of 100 $m^3$. To this sodium hydroxide solution were added 2 kmol of Si as a solution of waterglass having a content of 170 g Si/liter.

After the commencement of sparging with nitrogen and after switching on the stirrer, the solution was heated to 70° C., after which 54.25 m³ of an iron(II) sulfate solution having a content of 103 g of Fe/liter were subsequently pumped in over 51 minutes. The rate of precipitation was accordingly 0.589 mol of Fe/hour per mol of NaOH.

The Fe(III) content of the iron sulfate solution corresponded to 0.42 mol % Fe(III). After the addition was complete, the pH was 7.4 (measured at 70° C.). The nitrogen supply was then turned off and the reaction batch was sparged with 200 m³/hour of air via a sparging ring mounted beneath the stirrer. Sparging was terminated after 7.5 hours, when a Fe(III) content of 67.3 mol % had been reached. The oxidation rate was accordingly 13.33 mol % of Fe(II)/hour.

After this reaction was complete, the suspension was filtered and the solid was thoroughly washed with deionized water and dried at 80° C. in air. The powder obtained was ground in an impact mill.

The magnetite obtained had the following properties:

| | | |
|---|---|---|
| Si content | 0.72% by weight | |
| Coercivity | 74 Oe | $\hat{=}$ 5.89 KA/m |
| Spec. remanence | 156 Gcm³/g | $\hat{=}$ 15.6 nTm³/g |
| Spec. saturation magnetization | 1071 Gcm³/g | $\hat{=}$ 107.1 nTm³/g |
| Particle size | 0.1 μm | |
| BET specific surface | 14.3 m²/g | |
| Settled apparent density | 1.15 g/cm³ | |

Example 2

8000 kg of sodium hydroxide solution having a content of 300 g/l, corresponding to 200 kmol of NaOH, were introduced into a stirred vessel having a usable volume of 100 m³. To this sodium hydroxide solution were added 2.4 kmol of Si as a solution of waterglass having a content of 170 g Si/liter.

After the commencement of sparging with nitrogen and after switching on the stirrer, the solution was heated to 70° C., after which 59.25 m³ of an iron(II) sulfate solution having a content of 96 g of Fe/liter were subsequently pumped in over 51 minutes. The Fe(III) content of the iron sulfate solution corresponded to 0.51 mol % Fe(III). The rate of precipitation was accordingly 0.599 mol of Fe/hour per mol NaOH.

After the addition was complete, the pH was 7.1 (measured at 70° C.). The nitrogen supply was then turned off and the reaction batch was sparged with 200 m³/hour of air via a sparging ring mounted beneath the stirrer. Sparging was terminated after 8.5 hours, when a Fe(III) content of 67.0 mol % had been reached. The oxidation rate was accordingly 11.76 mol % of Fe(I)/hour.

After this reaction was complete, the suspension was filtered and the solid was thoroughly washed with deionized water and dried at 80° C. in air. The powder obtained was ground in an impact mill.

The magnetite obtained had the following properties:

| | | |
|---|---|---|
| Si content | 0.79% by weight | |
| Coercivity | 67 Oe | $\hat{=}$ 5.33 KA/m |
| Spec. remanence | 146 Gcm³/g | $\hat{=}$ 14.6 nTm³/g |
| Spec. saturation magnetization | 1065 Gcm³/g | $\hat{=}$ 106.5 nTm³/g |
| Particle size | 0.1 μm | |
| BET specific surface | 12.3 m²/g | |
| Settled apparent density | 1.12 g/cm³ | |

Example 3

1668 kg of sodium hydroxide solution having a content of 300 g/l, corresponding to 41.7 kmol of NaOH, were introduced into a stirred vessel having a usable volume of 30 liters. To this sodium hydroxide solution were added 0.42 kmol of Si as a solution of waterglass having a content of 170 g Si/liter.

After the commencement of sparging with nitrogen and after switching on the stirrer, the solution was heated to 70° C., after which 14.72 liters of an iron(II) sulfate solution having a content of 75.9 g of Fe/liter were subsequently pumped in over 37 minutes. The rate of precipitation was accordingly 0.778 mol of Fe/hour per mol NaOH. The Fe(III) content of the iron sulfate solution corresponded to 0.61 mol % Fe(III).

After the addition was complete, the pH was 7.4 (measured at 70° C.). The nitrogen supply was then turned off and the reaction batch was sparged with 40 liters/hour of air via a sparging ring mounted beneath the stirrer. Sparging was terminated after 519 minutes, when a Fe(III) content of 67.0 mol % had been reached. The oxidation rate was accordingly 11.56 mol % of Fe(II)/hour.

After this reaction was complete, the suspension was filtered and the solid was thoroughly washed with deionized water and dried at 80° C. in air. The powder obtained was ground in an impact mill.

The magnetite obtained had the following properties:

| | | |
|---|---|---|
| Si content | 0.8% by weight | |
| Coercivity | 45 Oe | $\hat{=}$ 3.58 KA/m |
| Spec. remanence | 35 Gcm³/g | $\hat{=}$ 3.5 nTm³/g |
| Spec. saturation magnetization | 1111 Gcm³/g | $\hat{=}$ 111.1 nTm³/g |
| Particle size | 0.1 μm | |
| BET specific surface | 9.0 m²/g | |
| Settled apparent density | 1.22 g/cm³ | |

Example 4

1668 kg of sodium hydroxide solution having a content of 300 g/l, corresponding to 41.7 kmol of NaOH, were introduced into a stirred vessel having a usable volume of 30 liters. To this sodium hydroxide solution were added 0.42 kmol of Si as a solution of waterglass having a content of 170 g Si/liter.

After the commencement of sparging with nitrogen and after switching on the stirrer, the solution was heated to 65° C., after which 13.52 liters of an iron(II) sulfate solution having a content of 85.0 g of Fe/liter were subsequently pumped in over 45 minutes. The rate of precipitation was accordingly 0.666 mol of Fe/hour per mol NaOH. The Fe(III) content of the iron sulfate solution corresponded to 0.47 mol % Fe(III).

After the addition was complete, the pH was 7.3 (measured at 70° C.). The nitrogen supply was then turned off and the reaction batch was sparged with 40 liters/hour of air via a sparging ring mounted beneath the stirrer. Sparging was terminated after 495 minutes, when a Fe(III) content of 67.0 mol % had been reached. The oxidation rate was accordingly 12.12 mol % of Fe(II)/hour.

After this reaction was complete, the suspension was filtered and the solid was thoroughly washed with deionized water and dried at 80° C. in air. The powder obtained was ground in an impact mill.

The magnetite obtained had the following properties:

| | | |
|---|---|---|
| Si content | 0.8% by weight | |
| Coercivity | 65 Oe | ≙ 5.17 KA/m |
| Spec. remanence | 59 Gcm³/g | ≙ 5.9 nTm³/g |
| Spec. saturation magnetization | 1067 Gcm³/g | ≙ 106.7 nTm³/g |
| Particle size | 0.1 μm | |
| BET specific surface | 10.7 m²/g | |
| Settled apparent density | 1.20 g/cm³ | |

Comparative Example 1

1668 kg of sodium hydroxide solution having a content of 300 g/l, corresponding to 41.7 kmol of NaOH, were introduced into a stirred vessel having a usable volume of 30 liters. To this sodium hydroxide solution were added 0.42 kmol of Si as a solution of waterglass having a content of 170 g Si/liter.

After the commencement of sparging with nitrogen and after switching on the stirrer, the solution was heated to 90° C., after which 14.72 liters of an iron(II) sulfate solution having a content of 75.9 g of Fe/liter were subsequently pumped in over 37 minutes. The rate of precipitation was accordingly 0.778 mol of Fe/hour per mol NaOH. The Fe(III) content of the iron sulfate solution corresponded to 0.61 mol % Fe(III).

After the addition was complete, the pH was 7.1 (measured at 90° C.). The nitrogen supply was then turned off and the reaction batch was sparged with 40 liters/hour of air via a sparging ring mounted beneath the stirrer. Sparging was terminated after 531 minutes, when a Fe(III) content of 67.4 mol % had been reached. The oxidation rate was accordingly 11.30 mol % of Fe(II)/hour.

After this reaction was complete, the suspension was filtered and the solid was thoroughly washed with deionized water and dried at 80° C. in air. The powder obtained was ground in an impact mill.

The magnetite obtained had the following properties:

| | | |
|---|---|---|
| Si content | 0.8% by weight | |
| Coercivity | 31 Oe | ≙ 2.47 KA/m |
| Spec. remanence | 27 Gcm³/g | ≙ 2.7 nTm³/g |
| Spec. saturation magnetization | 1093 Gcm³/g | ≙ 109.3 nTm³/g |
| Particle size | 0.2 μm | |
| BET specific surface | 7.2 m²/g | |
| Settled apparent density | 1.08 g/cm³ | |

Because of its particle size, this material was only of limited suitability for the production of finely divided toners. That is, the resolution thereof was inferior to that of toners that had been produced from more finely divided magnetites.

Comparative Example 2

1860 kg of sodium hydroxide solution having a content of 300 g/l, corresponding to 46.5 kmol of NaOH, were introduced into a stirred vessel having a usable volume of 30 liters. To this sodium hydroxide solution were added 0.42 kmol of Si as a solution of waterglass having a content of 170 g Si/liter.

After the commencement of sparging with nitrogen and after switching on the stirrer, the solution was heated to 90° C., after which 15.19 liters of an iron(II) sulfate solution having a content of 73.9 g of Fe/liter were subsequently pumped in over 37 minutes. The rate of precipitation was accordingly 0.700 mol of Fe/hour per mol NaOH. The Fe(III) content of the iron sulfate solution corresponded to 0.61 mol % Fe(III).

After the addition was complete, the pH was 11.9 (measured at 90° C.). The nitrogen supply was then turned off and the reaction batch was sparged with 40 liters/hour of air via a sparging ring mounted beneath the stirrer. Sparging was terminated after 702 minutes., when a Fe(III) content of 67.0 mol % had been reached. The oxidation rate was accordingly 8.54 mol % of Fe(II)/hour.

After this reaction was complete, the suspension was filtered and the solid was thoroughly washed with deionized water and dried at 80° C. in air. The powder obtained was ground in an impact mill.

The magnetite obtained had the following properties:

| | | |
|---|---|---|
| Si content | 0.8% by weight | |
| Coercivity | 34 Oe | ≙ 2.70 KA/m |
| Spec. remanence | 35 Gcm³/g | ≙ 3.5 nTm³/g |
| Spec. saturation magnetization | 1175 Gcm³/g | ≙ 117.5 nTm³/g |
| Particle size | 0.5 μm | |
| BET specific surface | 2.8 m²/g | |
| Settled apparent density | 0.45 g/cm³ | |

Because of its large particle size, this material not suitable for the production of finely divided toners.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of producing a magnetite having a specific surface of 9 to 15 m²/g, a coercivity of 45 Oe to 75 Oe, and a settled apparent density of 1.1 to 1.3 g/cm³ comprising (a) placing an alkaline component in the form of an aqueous solution in a vessel under a protective gas, (b) adding 1.0 to 3.0 mol %, relative to Fe of the magnetite, of a silicate component to form a reaction mixture, (c) heating the reaction mixture to a precipitation temperature of 60 to 80° C., (d) adding an iron(II) component at a rate of 0.5 to 1.5 mol of Fe/hour per equivalent of the alkaline component until the pH of the suspension is 7.0 to 8.5, and (e) oxidizing the suspension with an oxidizing agent at a rate of 20 to 5 mol % of Fe(II)/hour to an Fe(III) content of 65 to 75 mol % of Fe(III).

2. A method according to claim 1 wherein 1.7 to 2.5 mol %, relative to Fe of the magnetite, of silicate component (b) is added.

3. A method according to claim 1 wherein the Fe content of the iron(II) component is between 60 and 180 g of Fe/liter.

4. A method according to claim 1 wherein the Fe content of the iron(II) component is between 65 and 120 g of Fe/liter.

5. A method according to claim 1 wherein the Fe content of the iron(II) component is between 80 and 95 g of Fe/liter.

6. A method according to claim 1 wherein the Fe(III) content of the iron(II) component is between 0.2 and 1.2 mol % of Fe(III).

7. A method according to claim 1 wherein the Fe(III) content of the iron(II) component is between 0.3 and 0.6 mol % of Fe(III).

8. A method according to claim 1 wherein the iron(II) component is iron(II) sulfate or iron(II) chloride.

9. A method according to claim 1 wherein the alkaline component is an alkali hydroxide, an alkaline earth hydroxide, an alkaline earth oxide, an alkali carbonate, $MgCO_3$, or ammonia.

10. A method according to claim 1 wherein the oxidizing agent is atmospheric oxygen, pure oxygen, $H_2O_2$, chlorine, or an alkali metal chlorate or nitrate.

* * * * *